UNITED STATES PATENT OFFICE.

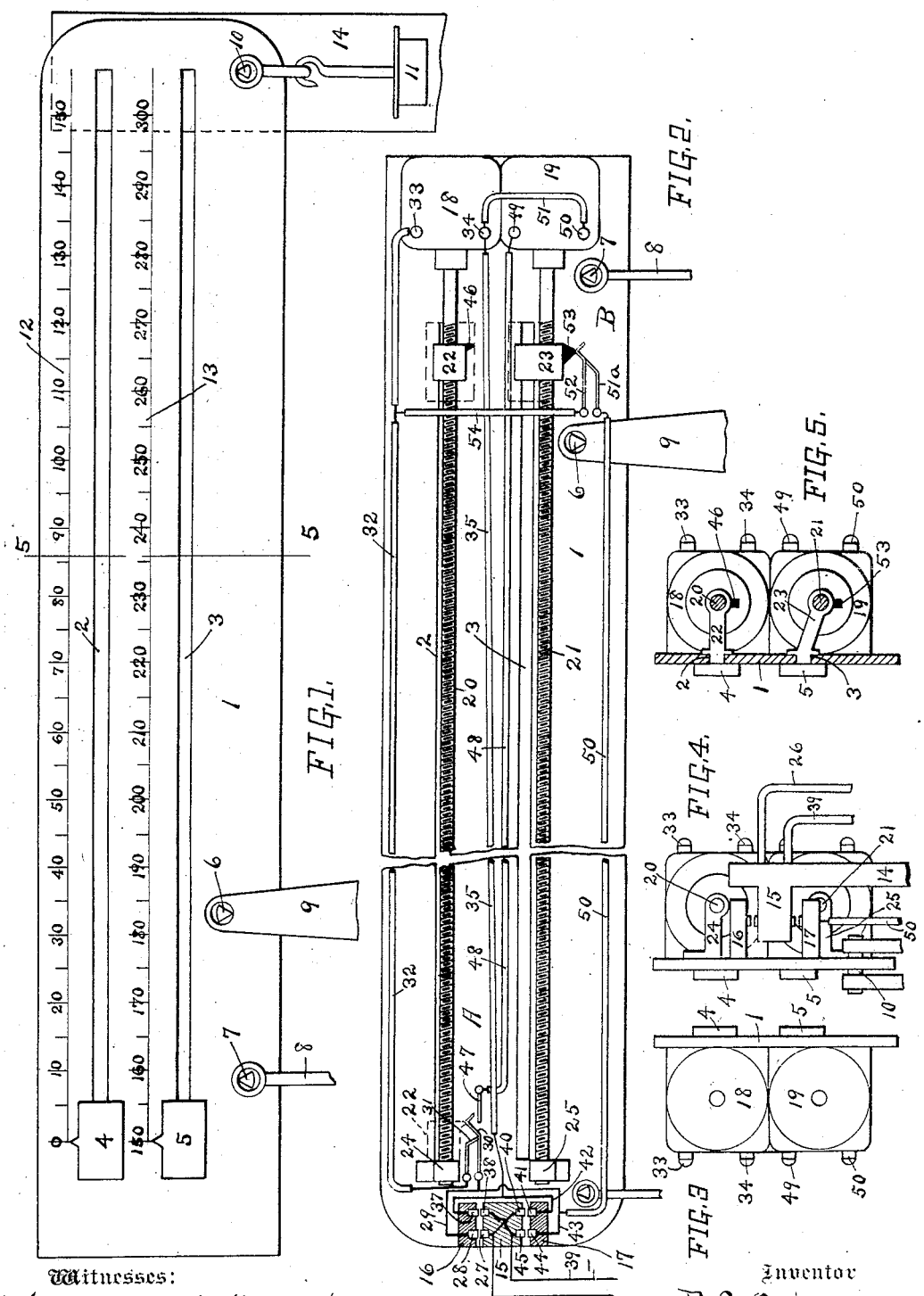

FRANCIS C. OSBORN, OF DETROIT, MICHIGAN.

AUTOMATIC WEIGHING-SCALE.

No. 888,646.  Specification of Letters Patent.  Patented May 26, 1908.

Application filed January 21, 1907. Serial No. 353,209.

*To all whom it may concern:*

Be it known that I, FRANCIS C. OSBORN, a citizen of the United States, and a resident of Detroit, in the county of Wayne and State of Michigan, have invented a new and Improved Automatic Weighing-Scale, of which the following is a specification.

My invention relates to automatic scales in which the weight of the article or person on the platform is indicated by a movable part of the scale, and the object of my improvements is to attach certain simple and easily maintained mechanism to the beam of any well known platform scale by means of which the weights on the beam will be moved out the required distance to balance the scale.

A further object of my improvement is to provide an automatic scale in which the weight on the platform will be indicated through the action of weights and levers, thus avoiding the use of springs.

A further object of this invention is to provide automatic means in the form of an electric motor to move the weight along a scale beam until the beam balances, the current to energize the motor being under the control of the beam.

My invention consists in means to accomplish these objects and in the details of construction fully explained in the following specification and pointed out in the claims.

I attain the above objects by the construction illustrated in the accompanying drawings, in which Figure 1 is a front view of a scale beam provided with two slidable weights. Fig. 2 is a rear view of this beam showing the motors and connections for the same, part of the construction being shown diagrammatic for the sake of clearness. Fig. 3 is an end view of the mechanism, taken from the left in Fig. 1. Fig. 4 is a view of the opposite end of the beam. Fig. 5 is a cross section on the line 5—5 in Fig. 1.

Similar reference characters refer to like parts throughout the several views.

Automatic scales are usually constructed with a metal spring that is flexed a greater or less extent according to the load upon the platform. An indicator is mounted so as to be moved according to the flexure of the spring. While this type of scale operates quickly, and when correctly adjusted, may also correctly indicate the load, still the necessity of adjustment of each individual scale on account of the practical impossibility of tempering all springs alike, and on account of the liability of the spring to fatigue, this type of scale is not entirely satisfactory.

In my present construction, there is no spring to fatigue or break, and the various parts can be made accurately in duplicate so that each scale will be operative when assembled. The beam and coöperating mechanism may be used with any type of platform, the beam being changed in dimensions to fit any standard scale.

In the drawings, the beam 1 is a flat plate of metal having two slots 2 and 3 in which are slidable the weights 4 and 5. The knife edge 6 rests in the upper end of the standard, and on the knife edge 7, the link 8 that connects to the platform levers is hung. The standard 9 and link 8 may be of any desired construction. A knife edge 10 at the free end of the beam carries the counter poise 11.

The weight 4 has a pointer that passes along the lower side of the upper graduated scale 12, while the lower weight 5 moves along the lower scale 13. When a load is placed on the platform, the upper weight runs out to indicate its weight. If the weight is more than can be indicated on the upper scale, the weight 4 remains at the outer end of its slot and the lower weight moves out. When the load is removed from the platform, the weight 5 first returns to normal position, and after that the weight 4 returns. Each weight is actuated by a small reversible electric motor, the upper weight controlling the current to the lower motor, while the position of the beam controls the direction of the current through the motors and also the cutting in and out of the current.

Independently mounted in the rear of the free end of the beam is an upright 14 having a lug 16 that projects between two lugs 16 and 17 on the beam. These lugs are all of insulating material and have contact points in pairs. On the opposite end of the beam are mounted two motors, 18 and 19, which are adapted to drive the screws 20 and 21. Nuts 22 and 23 are secured to the weights 4 and 5, so that the operation of the motors will move the weights inward or outward. The outer ends of the screws are mounted in the bearings 24 and 25.

The operation of the motors is controlled by two switches A and B. The operation of the mechanism is as follows With a load on the platform, the free end of the beam will rise and the contacts on the lug 17 will engage the lower contacts on the lug 15. The current from the wire 26 passes to contact 27 carried by the lug 15, thence to contact 28 on the lug 16 on the beam; thence by wire 29 to the leaf 30 on the switch A; thence to leaf 31; thence by wire 32 to post 33 of the motor, through its windings energizing the same, to its post 34; thence by wires 35 and 36 to the contact 37; thence by contact 38 to wire 39 to the current source. If the weight runs too far, the beam sinks and breaking the just followed circuit, it forms another which is as follows; from wire 26 to contact 40, to contact 41, over wire 42 to wire 35; thence over same to post 34 and through the motor to post 33; thence over wire 32 to leaf 31 of switch A; thence to leaf 30, down wire 43 to contact 44, contact 45 to wire 39 and the source of the current. The weight 5 is to be moved when the weight 4 is insufficient to counterbalance the load. This is done by the motor 19 the current to which is controlled by the switch A when acted upon by the insulated lug 46 on the nut 22 of the weight 4. When the nut has reached the end of its outward movement as indicated by the dotted lines in Fig. 2, the projection 46 engages the leaf 30 pressing it down out of contact with the leaf 31 and into contact with the leaf 47. The new path for the current will then be from the wire 26 to the leaf 30 as before, thence to leaf 47, wire 48 to post 49 on the motor 19; through the motor to post 50; thence over wire 51 to the post 34 and over wire 35 to the current source as before. When the load is removed and the beam falls, the current passes from the wire 26 to the contacts 40 and 41, wires 42 and 35 as before explained, as the path over the wire 32 is broken, the current does not pass through the motor 18 but over the wire 51 through the motor 19, reversing its direction, and returning the weight 5. The weight 4 would now normally remain in the outward position, the current to the motor 18 being cut out, and the weight 5 back to normal. To prevent this dead-lock I provide a short auxiliary circuit as follows. A wire 50 connects to the wire 43 and the leaf 51ª of the switch B. The wire 54 connects to the wire 32 and the leaf 52 of the same switch. The projection 53 presses the leaf 52 to engage the leaf 51ª when the weight 5 and its nut 23 are in normal position. As soon as the lower weight moves, this switch opens and cuts the auxiliary circuit. The operation is as follows;—As soon as the weight 4 reaches the end of its movement it opens the circuit to the motor 18. When the beam falls, and the weight 5 is in normal position, the current will pass from the wire 26 to contact 40, contact 41, over wire 42, wire 35, to post 34, through motor 18, to post 33, over wire 32, wire 54, leaf 52, leaf 51ª, wire 50, wire 43, contacts 44 and 45 and wire 39 to the current source, driving the motor 18 back and pulling the weight 4 inward. As soon as the weight moves, the leaves of the switch A resume their normal position and the usual path is open for the current. As soon as the weight 5 moves, the switch B is opened and the current to motor 18 is cut out.

Many other changes may be made by those skilled in the art of electric wiring.

Having now explained my improvements, what I claim as my invention and desire to secure by Letters Patent, is—

1. In a scale, the combination of a beam, weights independently movable longitudinally thereof, means to move said weights and means operated by one of said weights for controlling the movements of the other weight.

2. In a scale, the combination of a beam, two weights slidable thereon, and means to slide said weights forward and backward, electric circuits and contacts whereby the operation of said weights is controlled by the position of the beam, and switches in said circuits operated by each of the weights for controlling movements of the other weight.

3. In a scale, the combination of a beam, weights slidable thereon, electric motors, screw shafts connected to said weights and to said motors, contacts carried by said beam, stationary contacts adapted to engage the contacts on the beam, circuits between the contacts and motors, switches operated by said weights, and electric auxiliary circuits to said switches whereby the movement of one of the weights is controlled by the other and but one of the weights is permitted to move at one time.

4. In a scale, the combination of a beam, a weight slidable thereon, and an electric motor, means driven by said motor mounted on said beam and adapted to slide said weight forward and backwards, electric circuits and contacts whereby the direction of movement of the motor is controlled by the position of the beam, and a switch in the circuit of said motor and positioned on the beam so that the switch will be opened when the weight reaches the outer limit of its movement.

5. In a scale, the combination of a beam, weights slidable thereon, electric motors for moving each of the weights, contacts on the beam, stationary contacts mounted adjacent to the contacts on the beam, electric circuits mounted on the beam whereby currents may pass to the motors, the direction of the currents being controlled by the position of the beam, and switches in the circuits of said motors adapted to be operated by said weights whereby the movement of the weights is controlled.

6. In a scale, the combination of a beam, a plurality of weights mounted thereon and movable longitudinally thereof, independently movable, means to move said weights, and means whereby the movement of one weight along the beam is controlled by the other weight.

7. In a scale, the combination of a beam, a weight movable thereon, and electric motor, means driven by said motor to move said weight forward and backward, electric circuits for said motor, and a switch mounted on said beam and operable by said weight to limit the movement of the weight.

In testimony whereof I have signed my name in the presence of two subscribing witnesses.

FRANCIS C. OSBORN.

Witnesses:
 E. N. PAGELSEN,
 ELIZABETH M. BROWN.